United States Patent
Tabata et al.

(10) Patent No.: US 8,073,595 B2
(45) Date of Patent: Dec. 6, 2011

(54) LANE DEVIATION PREVENTION DEVICE

(75) Inventors: Yoshiaki Tabata, Zama (JP); Kou Satou, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 867 days.

(21) Appl. No.: 12/125,424

(22) Filed: May 22, 2008

(65) Prior Publication Data

US 2009/0005933 A1 Jan. 1, 2009

(30) Foreign Application Priority Data

Jun. 28, 2007 (JP) ................................. 2007-170718

(51) Int. Cl.
*G06G 7/76* (2006.01)
(52) U.S. Cl. ............. 701/42; 701/41; 701/300; 701/301
(58) Field of Classification Search ................... 701/41, 701/42, 300, 301
See application file for complete search history.

(56) References Cited

U.S. PATENT DOCUMENTS

| | | | |
|---|---|---|---|
| 6,970,787 B2* | 11/2005 | Matsumoto et al. | 701/301 |
| 7,058,494 B2* | 6/2006 | Matsumoto et al. | 701/41 |
| 7,117,076 B2* | 10/2006 | Shimakage et al. | 701/41 |
| 2002/0041229 A1* | 4/2002 | Satoh et al. | 340/438 |
| 2003/0097206 A1* | 5/2003 | Matsumoto et al. | 701/1 |
| 2004/0098197 A1* | 5/2004 | Matsumoto et al. | 701/301 |
| 2004/0153228 A1* | 8/2004 | Matsumoto et al. | 701/41 |
| 2004/0158377 A1* | 8/2004 | Matsumoto et al. | 701/48 |
| 2004/0186650 A1 | 9/2004 | Tange et al. | |
| 2005/0107931 A1* | 5/2005 | Shimakage et al. | 701/41 |
| 2005/0125125 A1* | 6/2005 | Matsumoto et al. | 701/41 |
| 2005/0177308 A1* | 8/2005 | Tange et al. | 701/301 |

FOREIGN PATENT DOCUMENTS

| | | |
|---|---|---|
| EP | 1674359 A1 | 6/2006 |
| JP | 6-274797 A | 9/1994 |
| JP | 2005-145243 | 6/2005 |
| JP | 2005-346269 A | 12/2005 |

OTHER PUBLICATIONS

Patent Abstracts of Japan publication No. 2005-145243, published Jun. 9, 2005 (1 page).
European Search Report for EP Application No. 08158729.7-2423, dated Jul. 2, 2010 (5 pages).
Office Action in Japanese Patent Application No. 2007-170718, dated Oct. 5, 2010 (2 pages).

* cited by examiner

*Primary Examiner* — Joanne Silbermann
*Assistant Examiner* — Michael Stabley
(74) *Attorney, Agent, or Firm* — Osha • Liang LLP (57) ABSTRACT

An apparatus to prevent a vehicle from deviating from a lane of travel includes an acquisition device configured to measure a yaw angle between the vehicle and the lane of travel, a lane deviation controller configured to output a yaw moment to maintain the vehicle in the lane of travel, a restriction device configured to restrict the yaw moment output when the measured yaw angle exceeds a first angle limit, and a correction device configured to adjust the first angle limit in response to a measured condition.

13 Claims, 7 Drawing Sheets

LANE DEVIATION PREVENTION DEVICE

CROSS-REFERENCE TO RELATED APPLICATIONS

The present application claims priority from Japanese Patent Application No. 2007-170718, filed Jun. 28, 2007. The contents of the priority application are hereby incorporated by reference in their entirety.

BACKGROUND OF THE DISCLOSURE

1. Field of the Disclosure

The present disclosure generally relates to a lane deviation prevention device configured to prevent a vehicle from deviating from a lane of travel when there is a tendency for the vehicle to deviate therefrom.

2. Description of the Related Art

As a lane deviation prevention control in the prior art, when there is a tendency for a vehicle to deviate from the travel lane, a differential braking force may be applied to the left/right wheels to create a yaw moment to direct the vehicle that might otherwise deviate from the lane of travel.

Examples of former systems include Japanese Kokai Patent Application No. 2005-145243. However, in using such former systems, when the yaw moment is applied to the vehicle corresponding to the yaw angle (i.e., the deviation angle) of the vehicle formed with respect to the travel lane, the yaw moment applied to the vehicle may be increased as the yaw angle becomes larger. Thus, it may be possible that the yaw moment becomes too large and may cause the driver to be uncomfortable with the amount of yaw moment applied. Consequently, it may be advantageous to apply a restriction to the lane deviation prevention control (application of a yaw moment). However, a driver may be distracted or annoyed by the end, restriction, or the timing of such a yaw moment.

SUMMARY OF THE CLAIMED SUBJECT MATTER

In one aspect, the disclosed subject matter includes an apparatus to prevent a vehicle from deviating from a lane of travel including an acquisition device configured to measure a yaw angle between the vehicle and the lane of travel, a lane deviation controller configured to output a yaw moment to maintain the vehicle in the lane of travel, a restriction device configured to restrict the yaw moment output when the measured yaw angle exceeds a first angle limit, and a correction device configured to adjust the first angle limit in response to a measured condition.

In another aspect, the disclosed subject matter includes a method to prevent a vehicle from deviating from a lane of travel including measuring a yaw angle between the vehicle and the lane of travel, outputting a yaw moment proportional to the measured yaw angle when the measured yaw angle is below a first angle limit, outputting a yaw moment non-proportional to the measured yaw angle when the measured yaw angle is below the first angle limit, and adjusting the first angle limit in response to a measured condition.

In another aspect, the disclosed subject matter includes an apparatus to prevent a vehicle from deviating from a lane of travel including a means for measuring a yaw angle between the vehicle and the lane of travel, a controller, a means for restricting an output of the controller means when the measured yaw angle exceeds a first angle limit, and a means for adjusting the first angle limit in response to a measured condition.

BRIEF DESCRIPTION OF DRAWINGS

Features of the present disclosure will become more apparent from the following description in conjunction with the accompanying drawings.

DETAILED DESCRIPTION

Exemplary embodiments of the present disclosure will be explained in more detail with reference to the Figures.

A first embodiment of the present disclosure pertains to a rear wheel drive vehicle provided with a lane deviation prevention device in accordance with the present disclosure. Such rear wheel drive vehicle may have an automatic transmission and a conventional differential, and may also carry a braking device capable of performing independent control of the braking force (e.g., hydraulic brake-line pressure) applied to each of the (front, rear, left, and right) wheels of the vehicle.

Figure 1:
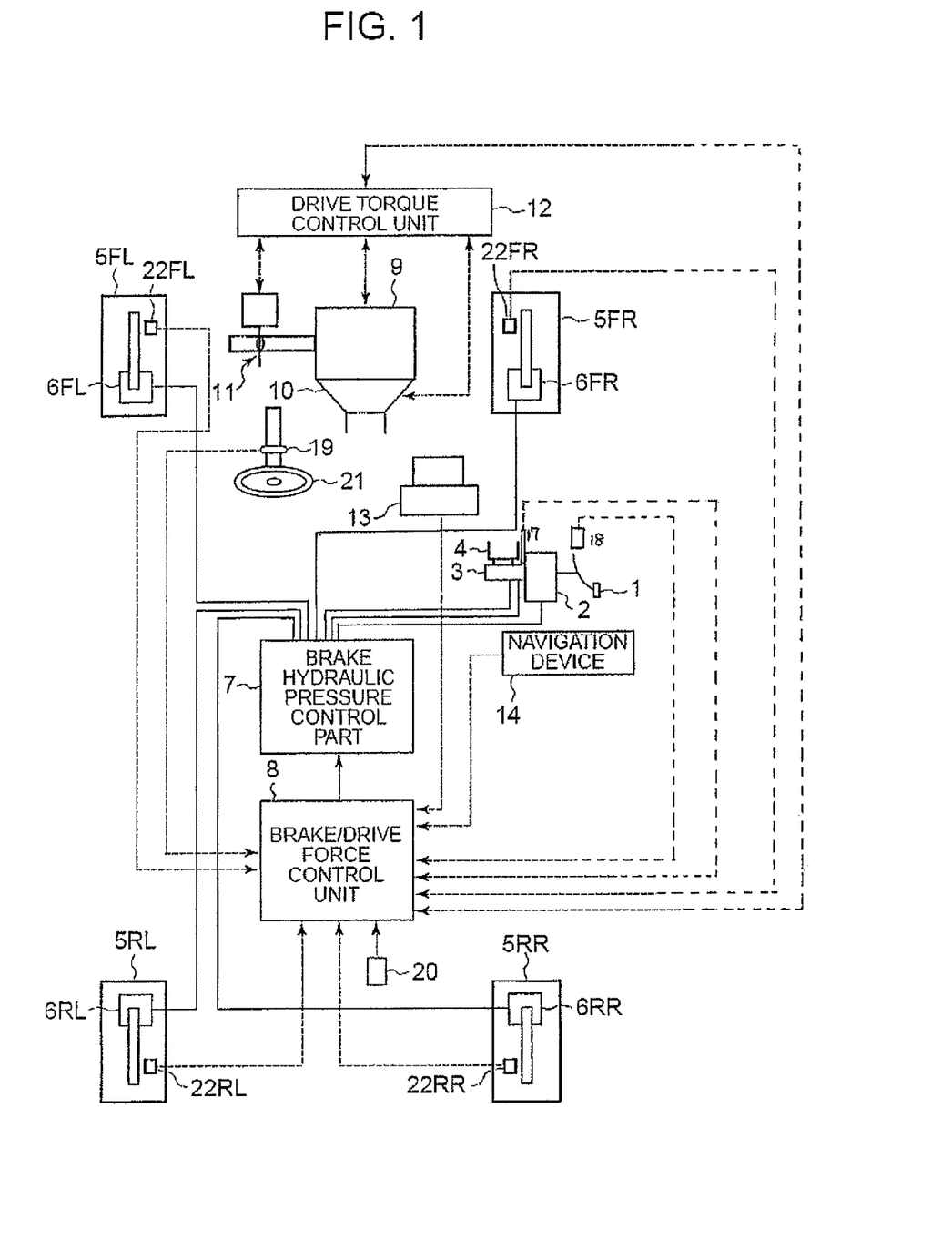
FIG. 1 is a schematic diagram of a vehicle in accordance with a first embodiment of the present disclosure.

As shown in schematic FIG. 1, item 1 represents a brake pedal, item 2 represents a (brake) booster, item 3 represents a master cylinder, and item 4 represents a (brake fluid) reservoir. Typically, a brake hydraulic pressure boosted by master cylinder 3 is fed to various wheel cylinders 6FL, 6FR, 6RL, and 6RR of wheels 5FL, 5FR, 5RL, and 5RR according to an amount said brake pedal 1 is pressed by a driver. Further, there may be a brake hydraulic pressure control component 7 arranged between master cylinder 3 and wheel cylinders 6FL-6RR. Brake hydraulic pressure control component 7 may make it possible to individually control the brake hydraulic pressure at each wheel cylinder 6FL-6RR.

Brake hydraulic pressure control component 7 may make use of a brake hydraulic pressure control component of an anti-lock (anti-skid) brake (ABS) control, a traction control (TCS), or a vehicle dynamics control (VDC) system. As such, brake hydraulic pressure control component 7 may work alone in controlling the brake hydraulic pressures of wheel cylinders 6FL-6RR, but it may also work to control the brake pressure corresponding to a brake pressure instruction value when input from a drive/braking force control unit 8, as explained below.

For example, brake hydraulic pressure control component 7 may have a structure containing an actuator in the hydraulic supply system. An example of this actuator is a proportional solenoid valve that can control the hydraulic pressure at each wheel cylinder 6FL-6RR to any desired brake hydraulic pressure.

The vehicle depicted in FIG. 1 also includes a drive torque control unit 12 to regulate drive torque to rear wheels 5RL, 5RR by controlling an operating state of engine 9, a selected transmission ratio of transmission 10 and a throttle opening of throttle valve 11. Said drive torque control unit 12 may further control the operating state of engine 9 by controlling the fuel injection quantity and the ignition timing, or by controlling the throttle opening at the same time. Drive torque control unit 12 may output a value of drive torque Tw (used to control the engine 9) to drive/braking force control unit 8.

Drive torque control unit 12 may also operate alone in controlling the drive torques of rear wheels 5RL and 5RR. However, it may also work to control the torques of the driving wheels corresponding to the instruction value of the drive torque instruction value when this value is input from drive/braking force control unit 8.

This vehicle may be provided with image capture device 13 equipped with an image processing function. Said image capture device 13 may detect the tendency of the vehicle to deviate from the lane by detecting the relative position of the vehicle in the travel lane. Image capture device 13 may consist of a single-lens camera composed of a CCD (charge coupled device) arranged to take pictures of the area ahead of the vehicle. Image capture device 13 (front camera) may be arranged in the front portion of the vehicle.

Image capture device 13 may detect the lane marking lines, such as white lines (lane markers) or the like from an image captured of the area ahead of the vehicle, and based on the lane markers detected it may compute the angle (i.e., the yaw angle) $Ø_{front}$ formed between the travel lane and the longitudinal axis of the vehicle, lateral displacement $X_{front}$ with respect to the travel lane, curvature β of the travel lane, etc.

In this way, image capture device 13 may detect the lane markers that mark the travel lane, and based on the detected lane markers, may compute yaw angle $Ø_{front}$. Image capture device 13 may output the computed yaw angle $Ø_{front}$, lateral displacement $X_{front}$ and travel lane curvature β to drive/braking force control unit 8.

Also, according to selected embodiments of the present disclosure, a device may be used to detect the lane markers with a detecting means other than the image capture device 13. For example, the lane markers may be detected by plural infrared (IR) sensors attached to the front portion of the vehicle, and the travel lane may be detected based on the detection result.

Further, it should be understood that the present disclosure should not be limited to a system that determines the travel lane based on lane markers. That is, when the road where the vehicle runs has no lane markers to define a travel lane, image processing may be performed. In particular, a judgment may be made as to whether the vehicle is within the appropriate road travel range from the road shape and environment information obtained with various types of sensor, and the driver may estimate the road range where the vehicle should run, so that a travel lane is determined. For example, assuming that the road has no lane markers, and that there are cliffs on the two sides of the road, the asphalt paved portion of the road may be taken as the travel lane. Also, when there are guard rails, curbs, etc., such information may be taken into consideration in determining the travel lane.

Also, said travel lane curvature β may be computed based on steering angle δ of steering wheel 21.

Furthermore, a navigation device 14 may be installed in the vehicle. Navigation device 14 may detect longitudinal acceleration Yg or lateral acceleration Xg generated by the vehicle, or yaw rate Ø' generated by the vehicle. Said navigation device 14 may output the detected longitudinal acceleration Yg, lateral acceleration Xg and yaw rate Ø' together with the road information to drive/braking force control unit 8.

Furthermore, various values may be detected by means of dedicated sensors. That is, longitudinal acceleration Yg and lateral acceleration Xg may be detected with an acceleration sensor (i.e., an accelerometer), and yaw rate Ø' may be detected with a yaw rate sensor.

Furthermore, the vehicle may include the following parts installed in it: a master cylinder pressure sensor 17 that detects the output pressure of master cylinder 3, that is, master cylinder hydraulic pressure Pm, an accelerator opening degree sensor 18 that detects the amount that the accelerator pedal is depressed, that is accelerator opening degree θ, a steering angle sensor 19 that detects the steering angle δ of steering wheel 21, a direction indicating switch 20 that detects a direction indicating operation by the directional indicators, and wheel velocity sensors 22FL, 22FR, 22FL, and 22RR that detect the so-called wheel velocity Vwi (where, i=fl, fr, rl, and rr) of wheels 5FL-5RR. Here, the detection signals detected with said sensors, etc., may be output to drive/braking force control unit 8.

Figure 2:
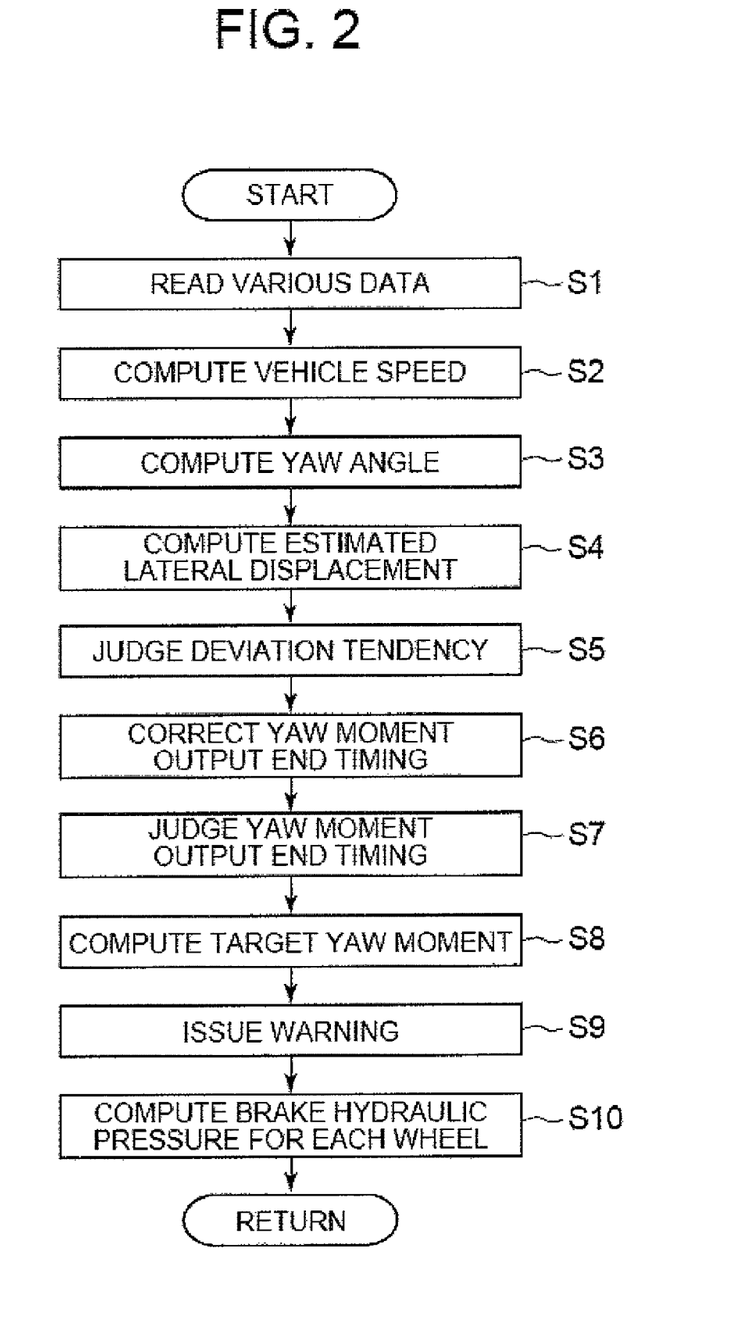
FIG. 2 is a flow chart illustrating the processing of the control unit of a vehicle lane deviation prevention device in accordance with embodiments of the present disclosure.

The arithmetic and logic operations (processing routine) performed using drive/braking force control unit 8 will now be explained. FIG. 2 is a flow chart illustrating the arithmetic and logic operational procedure. These arithmetic and logic operations may be executed by means of timer interrupt at each prescribed sampling interval ΔT of every 10 msec, for example. Here, communication processing is not shown in the processing shown in FIG. 2, and while refreshing storage may be performed in the standby storage device for the information obtained in the arithmetic and logic operations, the necessary information may be read from the standby storage device.

As shown in FIG. 2, when processing is started, first, in step S1, the various types of data are read from said various sensors, controller, and control unit. More specifically, the data read include longitudinal acceleration Yg, lateral acceleration Xg, yaw rate Ø' and road information obtained using navigation device 14, wheel velocity Vwi for each wheel, steering angle δ, accelerator opening degree θ, master cylinder hydraulic pressure Pm, and directional switch signals detected with various sensors, along with drive torque Tw from drive torque control unit 12 as well as lateral displacement $X_{front}$ and travel lane curvature β from image capture device 13.

Then vehicle speed V is computed in step S2. More specifically, based on wheel velocity Vwi read in said step S1, vehicle speed V may be computed using following Equation (1).

For front wheel drive, $$V = (Vwrl + Vwrr)/2$$

For rear wheel drive, $$V = (Vwfl + Vwfr)/2 \qquad (1)$$

Here, Vwfl, Vwfr represent the wheel velocities of the left/right front wheels, respectively, and Vwrl, Vwrr represent the wheel velocities of the left/right rear wheels, respectively. With Equation (1), vehicle speed V may be computed as the mean value of the velocities of the non-driven wheels. In the first embodiment, since the vehicle is rear wheel drive, the latter equation using the wheel velocities of the front wheels may be used to compute vehicle speed V.

Said vehicle speed V computed as described may be adopted during normal operation. When ABS (Anti-lock Brake System) control or the like operates, the estimated speed of the vehicle body determined under ABS control is adopted as said vehicle speed V.

Then, yaw angle $Ø_{front}$ may be computed in step S3. More specifically, yaw angle $Ø_{front}$ of the vehicle may be computed with respect to the lane markers extending into the distance and detected by image capture device 13.

Here, the computed yaw angle $Ø_{front}$ may become the value measured by image capture device 13. However, instead of this measured value, yaw angle $Ø_{front}$ can also be computed based on the lane markers near the vehicle and captured by image capture device 13. For example, lateral displacement $X_{front}$ read in said step S1 may be used to compute yaw angle $Ø_{front}$ using Equation (2) as follows:

$$Ø_{front} = \tan^{-1}(V/dx'(=dY/dX)) \quad (2)$$

Where, dX represents the change in lateral displacement X per unit time; dY represents the change in the running direction per unit time; and dX' represents the differential value of said change dX.

When yaw angle $Ø_{front}$ is computed based on the lane markers near the vehicle, the scheme should not be limited to that of computing yaw angle $Ø_{front}$ by means of lateral displacement X, as shown in Equation (2). For example, a scheme can may be adopted in which the lane markers detected near the vehicle are used to predict the locations of lane markers extended far away, and yaw angle $Ø_{front}$ may be computed based on the extended lane markers. Here, V represents the vehicle speed computed in said step S2.

Then the estimated lateral displacement may be computed in step S4. More specifically, travel lane curvature P and the current lateral displacement $X_{front}$ obtained in step S1, vehicle speed V obtained in step S2, and yaw angle $Ø_{front}$ obtained in step S3 may be used to compute estimated lateral displacement Xs using following Equation (3).

$$Xs = Tt \cdot V \cdot (Ø_{front} + Tt \cdot V \cdot \beta) + X_{front} \quad (3)$$

Here, Tt represents the vehicle headway time for computing the forward observation distance. This vehicle headway time Tt may be multiplied by vehicle speed V to get the aforementioned forward observation point distance. That is, the estimated value of the lateral displacement from the center of the travel lane after said vehicle headway time Tt may become future lateral displacement Xs. According to Equation (3), one may see that the larger the yaw angle $Ø_{front}$, the larger the estimated lateral displacement Xs.

Figure 3:
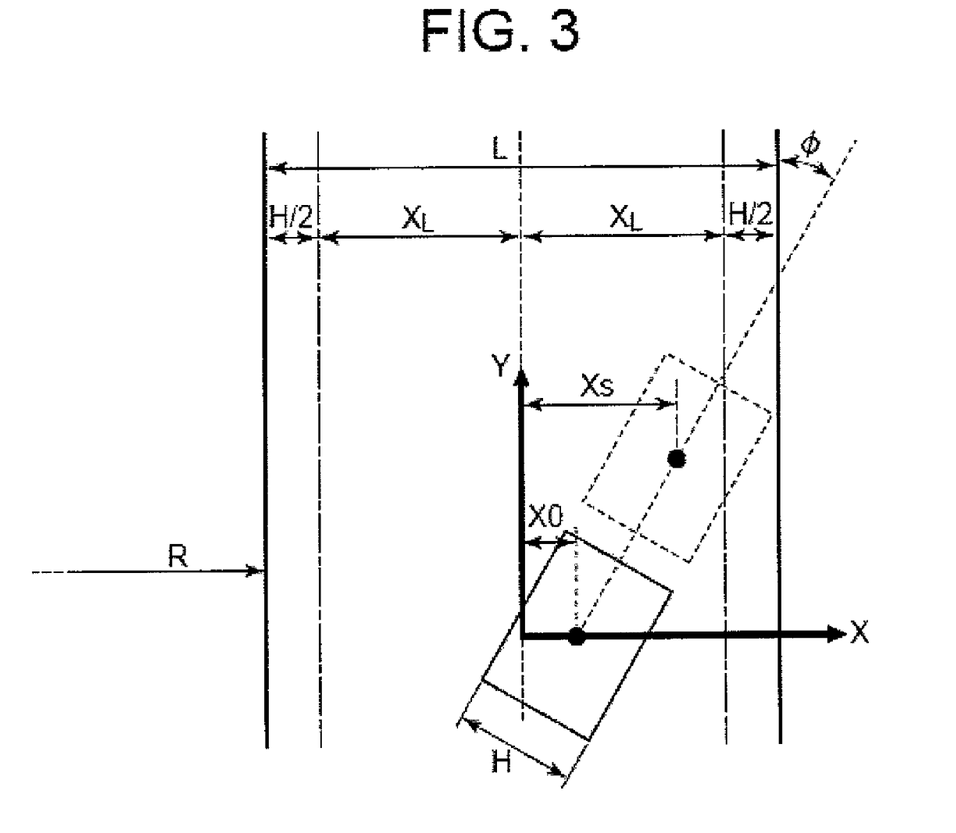
FIG. 3 is a diagram illustrating estimated lateral displacement $X_S$ and threshold $X_L$ for judging the tendency to deviate in accordance with embodiments of the present disclosure.

Then, in step S5, the tendency of the vehicle to deviate from the travel lane may be judged. More specifically, by comparing threshold $X_L$ for determining the tendency to deviate and estimated lateral displacement Xs obtained in said step S4, it may be possible to judge the tendency to deviate. FIG. 3 shows the definition of the values used in the processing.

Threshold $X_L$ for determining the tendency to deviate is a value that can be used to judge the tendency of the vehicle to deviate from the lane, and it may be obtained as an empirical value or experimental value. For example, threshold $X_L$ for determining the tendency to deviate may be a value indicating the position of the travel lane boundary line, and it can be computed using following Equation (4).

$$X_L = (L-H)/2 \quad (4)$$

Here, L represents the lane width of the travel lane (width between the lane markers that define the travel lane), and H represents the width of the vehicle. Lane width L can be obtained by processing of the image picked up by image capture device 13.

Here, when the magnitude (i.e., the absolute value) of estimated lateral displacement Xs is larger than threshold $X_L$ for determining the tendency to deviate (i.e., $|Xs| \geq X_L$), it may be determined that there is a tendency to deviate from the lane, and deviation judgment flag Fout may be set ON. Similarly, when estimated lateral displacement Xs is smaller than threshold $X_L$ for determining the tendency to deviate (i.e., $|Xs| < X_L$), it may be determined that there is no tendency to deviate from the lane, and deviation judgment flag Fout may be set OFF.

Judgment of the tendency to deviate from the lane may also be performed using the actual lateral displacement $X_{front}$ (i.e., the estimated lateral displacement Xs when Tt=0) instead of the estimated lateral displacement Xs. In this case, when the magnitude (i.e., the absolute value) of the actual lateral displacement $X_{front}$ is larger than threshold $X_L$ for determining the tendency to deviate ($|X_{front}| \geq X_L$), it may be determined that there is a tendency to deviate from the lane, and deviation judgment flag Fout may be set to ON.

Also, with regard to the condition that allows setting said deviation judgment flag Fout ON, it may be set when the vehicle enters the non-deviated state (e.g., $|Xs| < X_L$ or $|X_{front}| < X_L$) after deviation judgment flag Fout is set to OFF. Also, with regard to the condition that allows setting said deviation judgment flag Fout ON, it may be set after a prescribed time has elapsed following the setting of deviation judgment flag Fout to OFF.

Also, as shown in FIG. 3, threshold $X_L$ for determining the tendency to deviate (lateral displacement limit distance) may be set within the travel lane of the vehicle. However, the present disclosure should not be limited to this. It may also be set on the outside of the travel lane. Also, the present disclosure should not be limited to judgment of the tendency to deviate before the vehicle deviates from the travel lane. For example, threshold $X_L$ for determining the tendency to deviate may be set such that the tendency is judged when at least one wheel has deviated from the lane.

After deviation judgment flag Fout is set, a determination may be made as to deviation direction Dout based on lateral displacement X. More specifically, when there is lateral displacement to the left from the center of the lane, its direction may be set as deviation direction Dout (e.g., Dout=LEFT), and when there is lateral displacement to the right from the center of the lane, its direction may be set as Dout (e.g., Dout=RIGHT).

Furthermore, deviation judgment flag Fout may be set OFF in order to perform control for preventing deviation from the lane in the case of anti-skid control (ABS), traction control (TCS), or vehicle dynamics control (VDC).

Additionally, deviation judgment flag Fout may be set taking into consideration an intention of the driver to change lanes. For example, when a direction indicated by a lane change signal (i.e., blinker ON side) and the direction indicated by said deviation direction Dout are the same, it may be determined that the driver intends to change lanes, and deviation judgment flag Fout may be turned OFF. Thus, the determination may be modified to no lane deviation. On the other hand, when the direction indicated by the lane change signal (i.e., blinker ON side) and the direction indicated by said deviation direction Dout are different from each other, said deviation judgment flag Fout may be maintained and kept ON. That is, the determination may be maintained as a lane deviation.

Further, when direction indicating switch (i.e., turn signal) 20 is not operated, deviation judgment flag Fout may be set based on steering angle δ. That is, when the driver steers the wheel in the direction of deviation from the lane, if both steering angle δ and the rate of change of the steering angle (e.g., angle per second) Δδ exceed the prescribed levels, respectively, it may be determined that the driver intends to change lanes, and deviation judgment flag Fout may be turned OFF.

Then, in step S6 regarding control for preventing deviation from the lane, the restriction timing or end timing of the output of a yaw moment to the vehicle may be corrected.

In the control for preventing deviation from the lane, when there is a tendency of the vehicle to deviate from the lane, it may be possible to prevent the vehicle from deviating from the travel lane by applying a prescribed yaw moment to the vehicle. In this step S6, correction is made to the restriction timing or end timing of the output of a yaw moment to the vehicle as the end timing of control for preventing deviation of the vehicle.

By returning the vehicle to the travel lane or having the vehicle change lanes as intended by the driver based on the judgment of the tendency to deviate in said step S5, it may be possible to eliminate the tendency to deviate from the lane (i.e., Fout=OFF). As a result, the control for preventing deviation from the lane may come to an end, meaning the output of a yaw moment to the vehicle may come to an end.

Separately from a judgment of the tendency to deviate in the control for preventing deviation from the lane, when yaw angle $\varnothing_{front}$ formed between the travel lane and the longitudinal axis of the vehicle reaches a prescribed threshold, the control may be restricted. More specifically, when yaw angle $\varnothing_{front}$ increasingly approaches a first yaw angle limit $\varnothing_{lim1}$ as the first threshold value for the control restriction judgment, control for preventing deviation from the lane may be suppressed. More specifically, an increase in the yaw moment applied to the vehicle for preventing deviation from the lane may be suppressed (i.e., reduced or modulated). When yaw angle $\varnothing_{front}$ becomes increases further and approaches a second yaw angle limit $\varnothing_{lim2}$ (i.e., where $\varnothing_{lim2}>\varnothing_{lim1}$) for the control restriction judgment as the second threshold, control for preventing deviation from the lane may be forced to terminate. That is, the yaw moment applied to the vehicle to prevent lane deviation may be set at zero (i.e., the yaw moment canceled).

Figure 4:
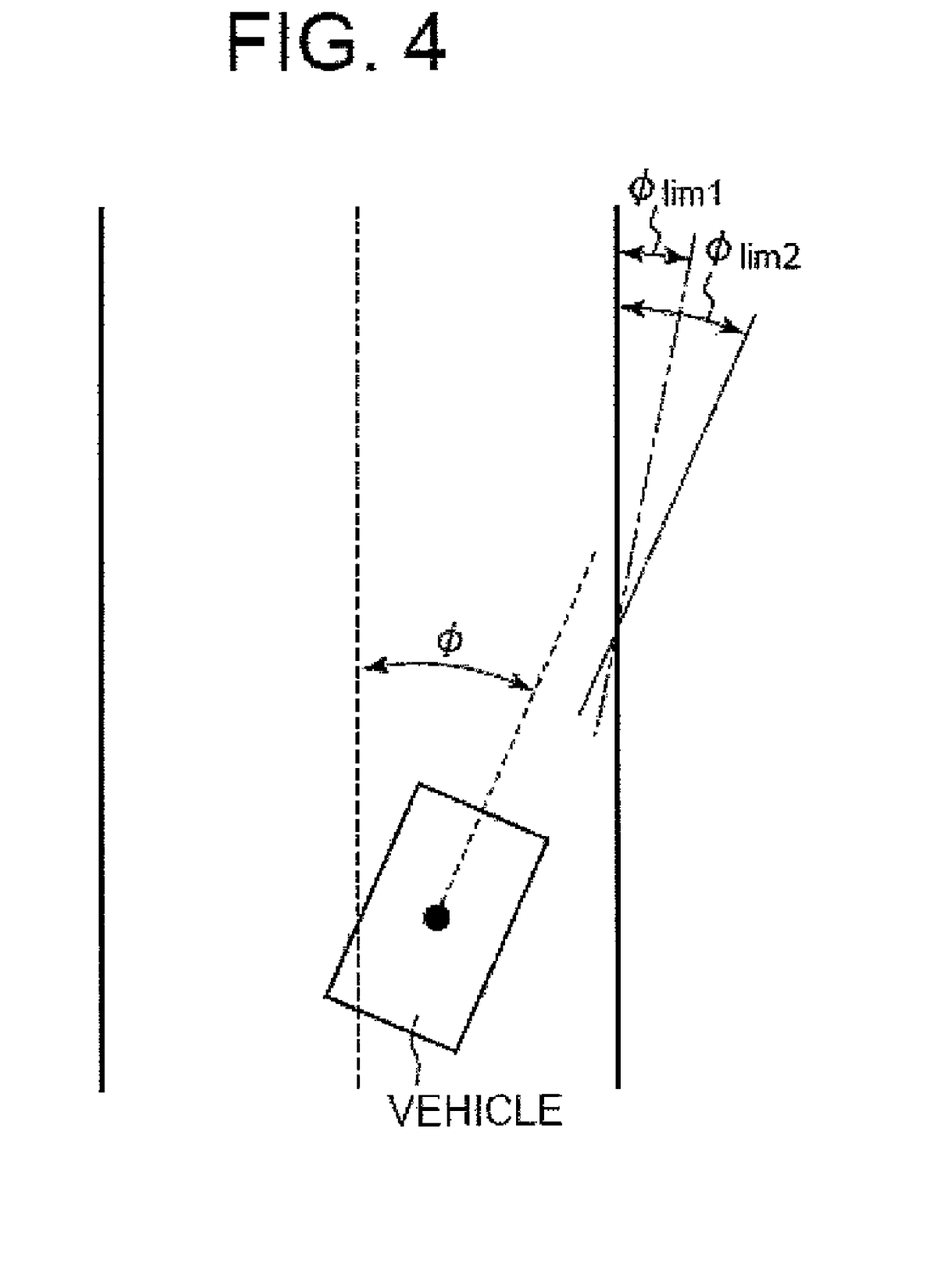
FIG. 4 is a diagram illustrating the relationship between a first yaw angle $\emptyset_{lim1}$ for control restriction judgment and a second yaw angle $\emptyset_{lim2}$ to control restriction judgment in accordance with embodiments of the present disclosure.

FIG. 4 is a diagram illustrating the relationship between first yaw angle limit $\varnothing_{lim1}$ for control restriction judgment and second yaw angle limit $\varnothing_{lim2}$ for control restriction judgment. Here, first yaw angle $\varnothing_{lim1}$ for control restriction judgment and second yaw angle limit $\varnothing_{lim2}$ for control restriction judgment may be defined as the yaw angles formed in the outer direction of the travel lane.

In step S6, the timing of restriction of control for preventing deviation from the lane, that is, first yaw angle limit $\varnothing_{lim1}$ for control restriction judgment and second yaw angle limit $\varnothing_{lim2}$ for control restriction judgment, may be corrected. More specifically, first yaw angle limit $\varnothing_{lim1}$ for control restriction judgment and second yaw angle limit $\varnothing_{lim2}$ for control restriction judgment may be adjusted based on the vehicle speed.

Figure 5:
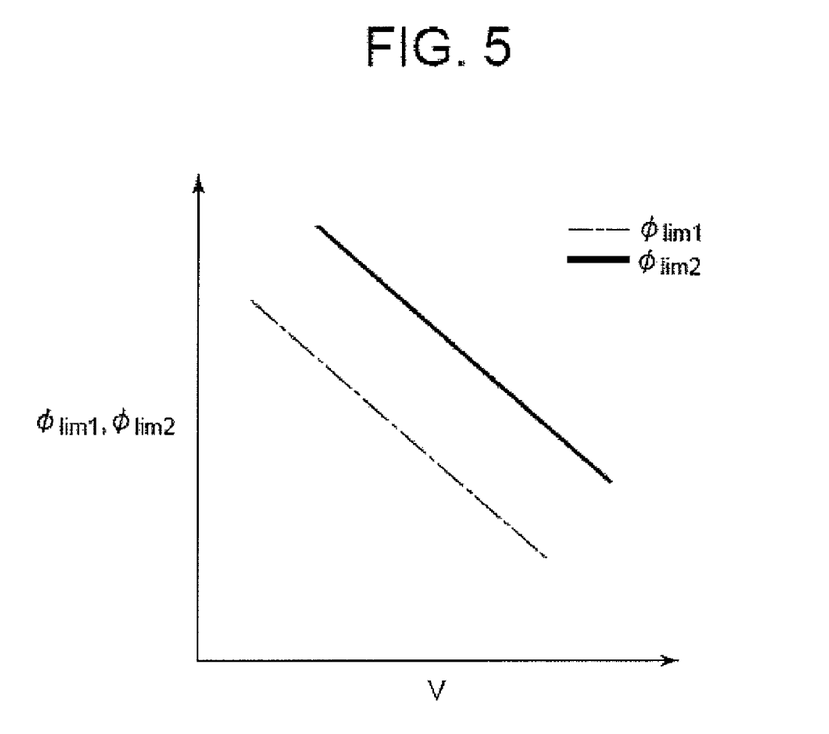
FIG. 5 is a diagram illustrating the characteristics of the relationship between vehicle speed V and the first and second yaw angles $\emptyset_{lim1}$, $\emptyset_{lim2}$ to control restriction judgment in accordance with embodiments of the present disclosure.

FIG. 5 shows the relationship between vehicle speed V and first yaw angle limit $\varnothing_{lim1}$ for control restriction judgment and second yaw angle limit $\varnothing_{lim2}$ for control restriction judgment.

As shown in FIG. 5, at a given vehicle speed V, second yaw angle limit $\varnothing_{lim2}$ for control restriction judgment may be larger than first yaw angle limit $\varnothing_{lim1}$. Both first yaw angle limit $\varnothing_{lim1}$ and second yaw angle limit $\varnothing_{lim2}$ may be reduced as vehicle speed V increases.

First yaw angle limit $\varnothing_{lim1}$ for control restriction judgment and second yaw angle limit $\varnothing_{lim2}$ for control restriction judgment may be set according to experimental values and known values. Because yaw angle $\varnothing_{front}$ may have a value affected by various environmental factors, such as straight lines, curves, low-friction road surfaces, the deviation direction (i.e., the direction towards the road edge or towards the center of the road), first yaw angle limit $\varnothing_{lim1}$ and second yaw angle limit $\varnothing_{lim2}$ may also be set taking hysteresis into account.

Further, in step S7, a judgment may be made as to the restriction timing or end timing of the output of a yaw moment to the vehicle in the control for preventing deviation from the lane.

Here, first yaw angle limit $\varnothing_{lim1}$ and second yaw angle limit $\varnothing_{lim2}$ corrected in S6 may be compared with yaw angle $\varnothing_{front}$, and a judgment made as to the timing for restricting the control for preventing deviation from the lane. According to the judgment, if yaw angle $\varnothing_{front}$ reaches the first yaw angle limit $\varnothing_{lim1}$ (i.e., $|\varnothing_{front}|\geq\varnothing_{lim1}$), control restriction flag (or control end preparation flag) Fout1 may be set ON (i.e., Fout1=ON). Otherwise, if $|\varnothing_{front}|<\varnothing_{lim1}$, control restriction flag Fout1 may be set OFF (Fout1=OFF). Then, if yaw angle $\varnothing_{front}$ rises further to reach second yaw angle limit $\varnothing_{lim2}$ (i.e., $|\varnothing_{front}|\geq\varnothing_{lim2}$), deviation judgment flag Fout may be set OFF (i.e., Fout=OFF). Otherwise, if $|\varnothing_{front}|<\varnothing_{lim2}$, deviation judgment flag Fout may be set ON (i.e., Fout=ON). In this case, control restriction flag Fout1 may be typically set to ON.

Further, in step S8, the target yaw moment applied to the vehicle as control for preventing deviation from the lane may be computed.

Figure 6:
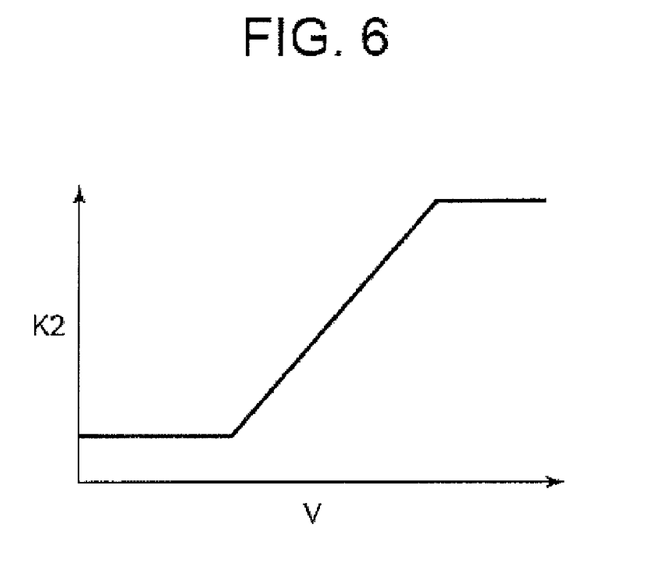
FIG. 6 is a diagram illustrating the characteristics of the relationship between vehicle speed V and gain K2 in accordance with embodiments of the present disclosure.

More specifically, based on estimated lateral displacement Xs obtained in step S4 and threshold $X_L$ for determining the tendency to deviate used in judgment of the tendency to deviate in said step S5, target yaw moment Ms may be computed using the following Equation (5).

$$Ms = K1 \cdot K2 \cdot (|Xs| - X_L) \tag{5}$$

Where K1 represents a proportional gain determined from the various parameters of the vehicle, and K2 represents a gain varying according to vehicle speed V. FIG. 6 is a diagram illustrating an example of gain K2. As shown in FIG. 6, gain K2 may have a smaller value in the low-speed region. Then, when a certain vehicle speed V is reached, gain K2 may increase along (e.g., proportionally) with the increase of vehicle speed V. After that, when a certain vehicle speed V is reached, gain K2 may become a constant value.

Here, target yaw moment Ms may be computed according to the state of deviation judgment flag Fout and control restriction flag Fout1.

First, when deviation judgment flag Fout is ON, target yaw moment Ms may be computed using said Equation (5).

When control restriction flag Fout1 is ON, that is, when yaw angle $\varnothing_{front}$ is larger than first yaw angle limit $\varnothing_{lim1}$ (more specifically, $\varnothing_{lim2}>|\varnothing_{front}|\geq\varnothing_{lim1}$), estimated lateral displacement Xs may be fixed, and Equation (5) may be used to compute target yaw moment Ms. More specifically, yaw angle $\varnothing_{front}$ as a variable of estimated lateral displacement Xs may be fixed at the value it has when yaw angle $\varnothing_{front}$ reaches first yaw angle limit $\varnothing_{lim1}$ for control restriction judgment (i.e., when $\emptyset_{front}=\emptyset_{lim1}$), estimated lateral displacement Xs may be computed, and computed estimated lateral displacement Xs may be used to compute target yaw moment Ms using said Equation (5).

When deviation judgment flag Fout is OFF, that is, when it is judged that the driver intends to change lanes, or when yaw angle $\emptyset_{front}$ is larger than second yaw angle limit $\emptyset_{lim2}$ for control restriction judgment (i.e., when $|\emptyset_{front}|\geq\emptyset_{lim2}$), target yaw moment Ms may be set at zero. In the control for preventing deviation from the lane in the present embodiment, the processing routine of the control for preventing deviation from the lane (FIG. 2) may be performed in multiple iterations until preventing deviation from the lane ends. That is, target yaw moment Ms may be successively applied to the vehicle in order to prevent deviation of the vehicle from the lane. As a result, the yaw moment may be applied to the vehicle by means of a series of processing routines embodied from the start to the end of control.

In this way, as target yaw moment Ms becomes zero because deviation judgment flag Fout is turned OFF, the next applied yaw moment Ms1 may be computed by subtracting a predetermined quantity $\Delta M$ from a presently applied yaw moment Ms0 computed in a preceding iteration of processing (i.e., Ms1=Ms0−$\Delta M$) until the next applied yaw moment Ms1 reaches the target yaw moment Ms which is set at zero. Predetermined quantity $\Delta M$ may be set at a value that is smaller than a value $\Delta M$max at which the driver feels discomfort with the amount of yaw moment applied.

As explained above, in selected embodiments, the larger the difference between estimated lateral displacement Xs and lateral displacement limit distance $X_L$, the larger the yaw moment Ms that may be applied. From the relationship between estimated lateral displacement Xs and yaw angle $\emptyset_{front}$ (see said Equation (3)), it may be observed that the larger the yaw angle $\emptyset_{front}$ (excluding the case when $\emptyset_{lim2}>|\emptyset_{front}|\geq\emptyset_{lim1}$), the larger the yaw moment Ms.

Further, in step S9, when deviation judgment flag Fout is ON, a sound output or a display output may be produced as a warning for preventing deviation from the lane.

When deviation judgment flag Fout is ON, that is, when the absolute value of target yaw moment Ms, |Ms|, is larger than 0, as the application of target yaw moment Ms to the vehicle for control to prevent deviation from the lane is started, said warning output may be made while said target yaw moment Ms is being applied. However, the output timing of the warning should not limited to this scheme. For example, it may be timed to issue the warning before the application of the yaw moment.

Further, in step S10, the target brake hydraulic pressure for each wheel may be computed. More specifically, the following computation may be performed.

As shown in the following Equations (6) and (7), when deviation judgment flag Fout is OFF, that is, when target yaw moment Ms is 0 (when control for preventing deviation from the lane is not performed), the target brake hydraulic pressures Psi to the various wheels (where i=fl, fr, rl, and rr) may be taken as brake hydraulic pressures Pmf and Pmr.

$$Psfl=Psfr=Pmf \tag{6}$$

$$Psrl=Psrr=Pmr \tag{7}$$

Where, Pmf represents the brake hydraulic pressure for the front wheels, and Pmr represents the brake hydraulic pressure for the rear wheels. It may have a value computed based on brake hydraulic pressure Pmf for the front wheels taking into consideration the front/rear allocation. For example, when the driver performs a braking operation, said brake hydraulic pressures Pmf, Pmr may become the values corresponding to the operation amount in the braking operation (i.e., master cylinder hydraulic pressure Pm).

On the other hand, when deviation judgment flag Fout is ON, that is, when the absolute value of target yaw moment Ms, |Ms|, is larger than zero, namely, when a judgment result that there is a tendency to deviate from the lane is obtained, based on the target moment Ms set in said step S8, a front wheel target brake hydraulic pressure difference $\Delta Psf$ and a rear wheel target brake hydraulic pressure difference $\Delta Psr$ may be computed. More specifically, said target brake hydraulic pressure differences $\Delta Psf$ and $\Delta Psr$ may be computed with the following Equations (8)-(11).

When |Ms|<Ms1:

$$\Delta Psf=0 \tag{8}$$

$$\Delta Psr=Kbr\cdot|Ms|/T \tag{9}$$

When |Ms|≧Ms1:

$$\Delta Psf=Kbf\cdot(|Ms|-Ms1)/T \tag{10}$$

$$\Delta Psr=Kbr\cdot Ms1/T \tag{11}$$

Here, Ms1 represents the setting threshold, and T represents the tread. For convenience, it may be assumed that tread T has the same value for the front and rear wheels. Further, Kbf, Kbr may represent conversion coefficients for the front wheels and rear wheels when the braking force is represented as equivalent brake hydraulic pressure, and they are determined by the various braking parameters.

In this way, allocation of the magnitude of the braking forces generated at the wheels may be determined according to the magnitude of target yaw moment Ms. That is, when target yaw moment Ms is smaller than setting threshold Ms1, front wheel target brake hydraulic pressure difference $\Delta Psf$ may be set at zero, and a prescribed value may be given to rear wheel target brake hydraulic pressure difference $\Delta Psr$, so that a difference in the braking forces at the left/right rear wheels is generated. On the other hand, when target yaw moment Ms is larger than threshold Ms1 for setting, predetermined values may be given to said target brake hydraulic pressure differences $\Delta Psf$, $\Delta Psr$, so that a difference in braking force is generated at the front/rear left/right wheels.

Thus, the final target brake hydraulic pressures Psi of the various wheels (i=fl, fr, rl, rr) may be computed using computed target brake hydraulic pressure differences $\Delta Psf$, $\Delta Psr$. More specifically, when deviation judgment flag Fout is ON and deviation direction Dout is LEFT, that is, when there is a tendency to deviate from the lane with respect to the left-hand side lane marker, the following Equations (12) may be used to compute the target brake hydraulic pressures Psi of the various wheels (where i=fl, fr, rl, and rr).

$$Psfl=Pmf$$

$$Psfr=Pmf+\Delta Psf$$

$$Psrl=Pmr$$

$$Psrr=Pmr+\Delta Psr \tag{12}$$

Further, when deviation judgment flag Fout is ON, and deviation direction Dout is RIGHT, that is, when there is a tendency to deviate from the lane with respect to the right-hand side lane marker, the following Equations (13) may be used to compute the target brake hydraulic pressures Psi of the various wheels (where i=fl, fr, rl, and rr).

$$Psfl=Pmf+\Delta Psr$$

$$Psfr = Pmf$$

$$Psrl = Pmr + \Delta Psr$$

$$Psrr = Pmr \quad (13)$$

According to Equations (12) and (13), when the braking force on the wheels on the side for preventing deviation from the lane rises, a difference in braking force may be generated between the left and right wheels.

Here, as shown in Equations (12) and (13), when the driver performs a braking operation, the target brake hydraulic pressures Psi of the various wheels (i=fl, fr, rl, and rr) may be computed taking into consideration brake hydraulic pressures Pmf and Pmr. Here, drive/braking force control unit 8 may output target brake hydraulic pressures Psi (i=fl, fr, rl, rr) of the various wheels computed as shown above as the brake hydraulic pressure instruction values given to brake hydraulic pressure control part 7.

In selected embodiments, operation may be performed as follows

When the vehicle runs, vehicle speed V and yaw angle $\emptyset_{front}$ are computed (said steps S2, S3) after the various types of data are read (said step S1). Then, after estimated lateral displacement Xs (estimated deviation value) is computed (said step S4), judgment may be made as to the tendency to deviate from the lane (setting of deviation judgment flag Fout) based on the computed estimated lateral displacement Xs, a while the judgment result of the tendency to deviate from the lane (deviation judgment flag Fout) is corrected according to the intention of the driver to change lanes (step S5).

Then, after target yaw moment Ms may be computed (step S8) a warning may be output (step S9) based on the result of judgment of the tendency to deviate from the lane. Based on the computed target yaw moment Ms, target brake hydraulic pressures Psi of the various wheels (i=fl, fr, rl, and rr) may be computed, and the computed target brake hydraulic pressures Psi of the various wheels (i=fl, fr, rl, and rr) may be output to brake hydraulic pressure control part 7 (e.g., step S10). As a result, a yaw moment may be applied to the vehicle corresponding to the tendency of the vehicle to deviate from the lane.

On the other hand, said first yaw angle limit $\emptyset_{lim1}$ for control restriction judgment and second yaw angle limit $\emptyset_{lim2}$ for control restriction judgment may be set (or corrected) according to vehicle speed V (step S6). During control for preventing deviation from the lane, yaw angle $\emptyset_{front}$ increases (although a yaw moment is applied to the vehicle), and if yaw angle $\emptyset_{front}$ reaches first yaw angle limit $\emptyset_{lim1}$ and second yaw angle limit $\emptyset_{lim2}$ for control restriction judgment (it usually reaches said first yaw angle $\emptyset_{lim1}$ for control restriction judgment first), control for preventing deviation from the lane may be restricted. More specifically, in the process of an increase in yaw angle $\emptyset_{front}$, if yaw angle $\emptyset_{front}$ reaches first yaw angle limit $\emptyset_{lim1}$, further increases in target yaw moment Ms applied to the vehicle for preventing deviation from the lane may be suppressed. In addition, if yaw angle $\emptyset_{front}$ reaches second yaw angle limit $\emptyset_{lim2}$, target yaw moment Ms applied to the vehicle for preventing deviation from the lane may be set at zero (e.g., step S7 and step S8). In this case, an increasing vehicle speed V may produce a reduced first yaw angle limit $\emptyset_{lim1}$ and second yaw angle limit $\emptyset_{lim2}$. Consequently, the timing of the start of restriction of control for preventing deviation from the lane may occur earlier as vehicle speed V increases.

Operation and Effects

As explained above, yaw angle $\emptyset_{front}$ may increase during control for preventing deviation from the lane, and if it reaches the first yaw angle limit $\emptyset_{lim1}$ and the second yaw angle limit $\emptyset_{lim2}$, control for preventing deviation from the lane may be restricted, modulated, or suppressed. More specifically, in the process of an increase in yaw angle $\emptyset_{front}$, if yaw angle $\emptyset_{front}$ reaches first yaw angle limit $\emptyset_{lim1}$ for control restriction judgment, a further increase in target yaw moment Ms applied to the vehicle for preventing deviation from the lane may be suppressed and may be set as a constant (i.e., independent of yaw angle $\emptyset_{front}$). In addition, if yaw angle $\emptyset_{front}$ reaches second yaw angle limit $\emptyset_{lim2}$ for control restriction judgment, target yaw moment Ms applied to the vehicle for preventing deviation from the lane may be set at zero. As a result, even when yaw angle $\emptyset_{front}$ increases, control for preventing deviation from the lane may be restricted, and it is possible to prevent the control quantity from becoming too large.

Also, first yaw angle limit $\emptyset_{lim1}$ and second yaw angle limit $\emptyset_{lim2}$ may be corrected according to the vehicle speed V. As a result, it is possible to restrict timing of control for preventing deviation from the lane at such that it does not make the driver feel uncomfortable with the change in applied yaw moment.

In selected embodiments, when the precondition is that the control for preventing deviation from the lane is restricted when yaw angle $\emptyset_{front}$ exceeds the yaw angle limit for control restriction judgment $\emptyset_{lim1}$, in spite of the fact the vehicle speed rises, the same restriction on the control for preventing deviation from the lane may be performed as that when the vehicle speed is low, and the driver feels uncomfortable with the applied yaw moment. That is, if control for preventing deviation from the lane is restricted based on yaw angle $\emptyset_{front}$, the driver may need control for preventing deviation from the lane to be restricted earlier when the vehicle speed is higher, while yaw angle $\emptyset_{front}$ has not yet increased.

Thus first yaw angle limit $\emptyset_{lim1}$ for control restriction judgment and second yaw angle limit $\emptyset_{lim2}$ for control restriction judgment may be set (i.e., corrected) according to vehicle speed V. More specifically, in selected embodiments, the higher the vehicle speed V, the smaller the first and second yaw angle limits $\emptyset_{lim1}$, $\emptyset_{lim2}$ for control restriction judgment. As a result, in selected embodiments, the higher the vehicle speed V, the earlier the restriction may be applied while the control for preventing deviation from the lane has not yet increased yaw angle $\emptyset_{front}$, so that restriction of control for preventing deviation from the lane is timed that it does not make the driver feel uncomfortable with the applied yaw moment.

As explained above, first yaw angle limit $\emptyset_{lim1}$ for control restriction judgment and second yaw angle limit $\emptyset_{lim2}$ for control restriction judgment may be used as thresholds for beginning and ending restriction of control for preventing deviation from the lane. As a result, an increase in target yaw moment Ms may be suppressed in the process of an increase yaw angle $\emptyset_{front}$. Then the yaw moment may be set at zero, and control for preventing deviation from the lane may come to an end. That is, control for preventing deviation from the lane may be restricted stepwise, or restriction of the control for preventing deviation from the lane may be applied gradually. As a result, it is possible to restrict control for preventing deviation from the lane without making the driver feel uncomfortable with the applied yaw moment.

As explained above, control for preventing deviation from the lane may be restricted and the control for preventing deviation from the lane comes to an end, that is, even when the yaw moment is set at zero, restriction may be applied to the reduced proportion, and the yaw moment is set at zero. As a result, it may be possible to restrict control for preventing deviation from the lane without making the driver feel uncomfortable with the applied yaw moment.

Second Exemplary Embodiment

In the second exemplary embodiment, the arithmetic and logic operation processing performed in drive/braking force control unit 8 may be the same as that shown in FIG. 2, and the same processing procedure as that of the first exemplary embodiment may be performed, except that the method for correcting the yaw angles used for judging restriction on control in step S6 is different.

In particular, in selected embodiments, step S6, with the precondition that judgment of restriction of control for preventing deviation from the lane is performed by means of a unique yaw angle limit for control restriction judgment $\varnothing_{lim3}$ (hereinafter to be referred to as the third yaw angle limit for judgment of control restriction), said third yaw angle limit $\varnothing_{lim3}$ for control restriction judgment may be corrected based on the width of the lane of travel.

Figure 7:
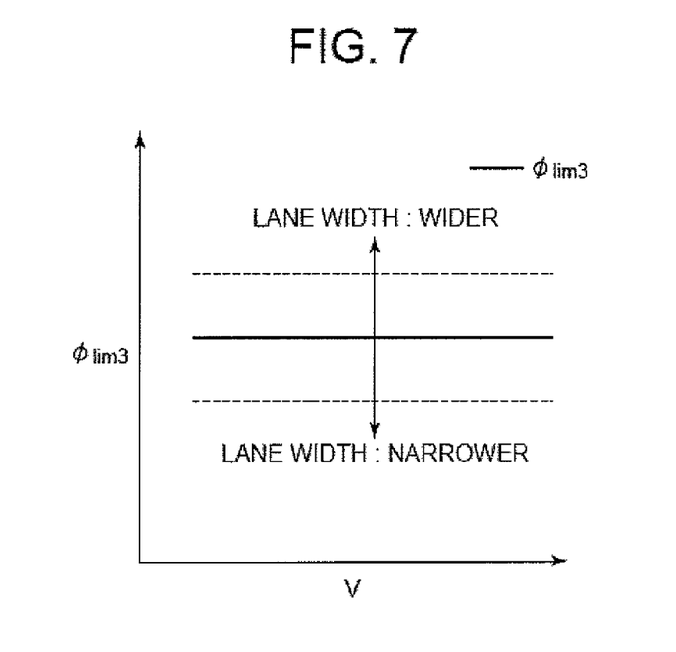
FIG. 7 is a diagram illustrating the characteristics of the relationship between the lane width of the travel lane and a third yaw angle $\emptyset_{lim3}$ to control restriction judgment in accordance with embodiments of the present disclosure.

FIG. 7 is a diagram illustrating the relationship between the width of the lane of travel and third yaw angle limit $\varnothing_{lim3}$ for control restriction judgment. As shown in FIG. 7, as the lane width narrows, the third yaw angle limit $\varnothing_{lim3}$ may become smaller.

In step S7 in selected embodiments, third yaw angle limit $\varnothing_{lim3}$ for control restriction judgment corrected in said step S6 may be compared with yaw angle $\varnothing_{front}$, and the timing of restriction of control for preventing deviation from the lane may be judged. According to this judgment, when yaw angle $\varnothing_{front}$ reaches third yaw angle limit $\varnothing_{lim3}$ for control restriction judgment (i.e., when $|\varnothing_{front}| \geq \varnothing_{lim3}$), deviation judgment flag Fout may be set to OFF.

As a result, when deviation judgment flag Fout is OFF, that is, when yaw angle $\varnothing_{front}$ is larger than the third yaw angle limit $\varnothing_{lim3}$ (i.e, when $|\varnothing_{front}| \geq \varnothing_{lim3}$), target yaw moment Ms may be set at zero in step S8. In this case, just as in the first exemplary embodiment, when target yaw moment Ms is reduced, restriction may be applied to the reduced proportion, and the target yaw moment Ms may be set at zero.

Operation, Function and Effect

In particular, in the second exemplary embodiment, third yaw angle limit $\varnothing_{lim3}$ for control restriction judgment may be corrected according to the width of the travel lane. More specifically, the narrower the lane width of the travel lane, the smaller the third yaw angle limit $\varnothing_{lim3}$ for control restriction judgment may be. As a result, the timing for restricting control for preventing deviation from the lane may be made earlier when the lane width of the travel lane is narrower.

For example, as in this embodiment, when there is a precondition that control for preventing deviation from the lane is restricted when yaw angle $\varnothing_{front}$ is larger than the yaw angle for control restriction judgment, although the lane width of the travel lane may become narrower, the same control for preventing deviation from the lane may be performed as that when the travel lane is wider, so that the driver does not feel uncomfortable with the applied yaw moment. That is, if restriction of control for preventing deviation from the lane is performed based on yaw angle $\varnothing_{front}$, the driver may need restriction of control for preventing deviation from the lane earlier, when yaw angle $\varnothing_{front}$ has not yet increased, if the travel lane is narrower.

Consequently, as the lane width of the travel lane becomes narrower, the third yaw angle limit $\varnothing_{lim3}$ for control restriction judgment may become smaller. The narrower the width of the travel lane, the earlier restriction if control for preventing deviation from the lane may be performed, while yaw angle $\varnothing_{front}$ has not yet increased, and it becomes possible to restrict timing control for preventing deviation from the lane such that the driver does not feel uncomfortable with the applied yaw moment.

Third Exemplary Embodiment

In the third exemplary embodiment, as with the first and second exemplary embodiments, the vehicle equipped with the lane deviation prevention device is a rear wheel drive vehicle.

In Embodiment 3, the arithmetic and logic operation processing procedure performed in drive/braking force control unit 8 may be the same as that shown in FIG. 2, and the same as that in the first and second exemplary embodiments, except that the method for correcting the yaw angle for control restriction judgment may be different in step S6.

That is, in the third exemplary embodiment, in step S6, the precondition may be that judgment of the timing of restricting control for preventing deviation from the lane may be performed by means of a unique yaw angle limit $\varnothing_{lim4}$ for control restriction judgment hereinafter to be referred to as the fourth yaw angle limit for control restriction judgment) $\varnothing_{lim4}$, and said fourth yaw angle limit $\varnothing_{lim4}$ for control restriction judgment may be corrected based on the vehicle speed V and the width of the travel lane.

Figure 8:
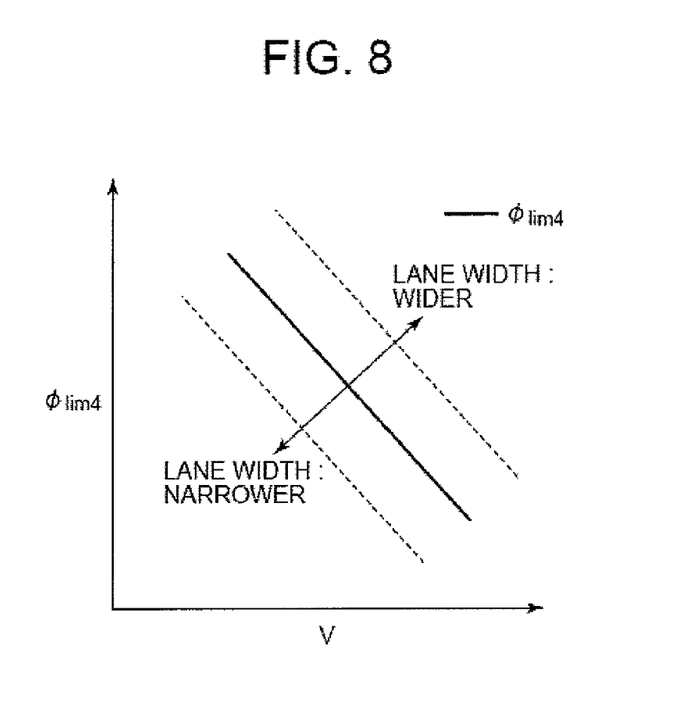
FIG. 8 is a diagram illustrating the characteristics of the relationship between vehicle speed V as well as the lane width of the travel lane and fourth yaw angle $\emptyset_{lim4}$ for control restriction judgment in accordance with embodiments of the present disclosure.

FIG. 8 is a diagram illustrating the relationship between vehicle speed V as well as the lane width of the travel lane and said fourth yaw angle limit $\varnothing_{lim4}$ for control restriction judgment.

As shown in FIG. 8, the higher the vehicle speed V, or the narrower the lane width of the travel lane, the smaller is the fourth yaw angle limit $\varnothing_{lim4}$ for control restriction judgment.

In step S7, fourth yaw angle limit $\varnothing_{lim4}$ corrected in step S6 may be compared with yaw angle $\varnothing_{front}$, and the timing of restriction of control for preventing deviation from the lane may be judged. According to this judgment, when yaw angle $\varnothing_{front}$ reaches said fourth yaw angle limit $\varnothing_{lim4}$ for control restriction judgment (i.e., when $|\varnothing_{front}| \geq \varnothing_{lim4}$), deviation judgment flag Fout may be set OFF.

As a result, in step S8, when deviation judgment flag Fout is turned OFF, that is, when yaw angle $\varnothing_{front}$ exceeds the fourth yaw angle limit $\varnothing_{lim4}$ for control restriction judgment (i.e, when $|\varnothing_{front}| \geq \varnothing_{lim4}$), target yaw moment Ms may be set at zero. In this case, just as in the first exemplary embodiment, restriction may be applied to the reduced proportion when target yaw moment Ms is reduced, and target yaw moment Ms may be set at zero.

Operation, Function and Effect

In particular, in the third exemplary embodiment, fourth yaw angle limit $\varnothing_{lim4}$ for control restriction judgment may be corrected according to vehicle speed V and the lane width of the travel lane. More specifically, the higher the vehicle speed V, or the narrower the lane width, the smaller is the fourth yaw angle limit $\varnothing_{lim4}$ for control restriction judgment. As a result, the higher the vehicle speed V or the narrower the width of the travel lane, the earlier may restrict control for preventing deviation from the lane. As a result, based on the same reasoning as in the first and second exemplary embodiments, it may be possible to restrict timing of control for preventing deviation from the lane such that the driver will not feel uncomfortable with the applied yaw moment.

Fourth Exemplary Embodiment

In this embodiment, just as in the first three exemplary embodiments, the vehicle equipped with the lane deviation prevention device of the present disclosure may be a rear wheel drive vehicle.

In selected embodiments, the arithmetic and logic operation processing performed by drive/braking force control unit 8 may be the same as that shown in FIG. 2, that is, it is the same as the processing procedure in the first exemplary embodiment, except that the method for correcting the yaw angle for control restriction judgment in step S6 may be different.

That is, in step S6, just as in the first exemplary embodiment, the precondition may be that judgment of the timing of restriction of the control for preventing deviation from the lane is done by means of said first and second yaw angle limits $\varnothing_{lim1}$, $\varnothing_{lim2}$ for control restriction judgment, and said first and second yaw angle limits $\varnothing_{lim1}$, $\varnothing_{lim2}$ for control restriction judgment may be corrected taking into consideration of the lane width of the travel lane.

Figure 9:
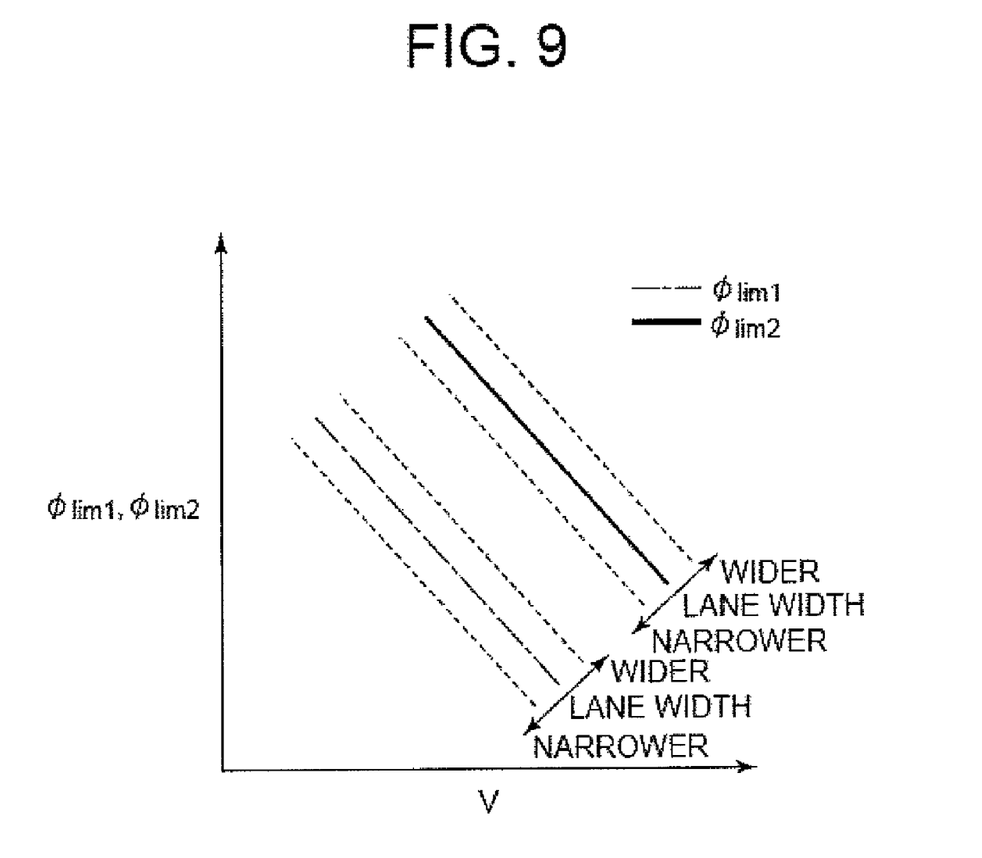
FIG. 9 is a diagram illustrating the characteristics of the relationship between vehicle speed V as well as the lane width of the travel lane and the first and second yaw angles $\emptyset_{lim1}$, $\emptyset_{lim2}$ for control restriction judgment in accordance with embodiments of the present disclosure.

FIG. 9 is a diagram illustrating the relationship between the width of the travel lane and said first and second yaw angle limits $\varnothing_{lim1}$, $\varnothing_{lim2}$ for control restriction judgment.

As shown in FIG. 9, in addition to the case when vehicle speed V is higher, said first and second yaw angle limits $\varnothing_{lim1}$, $\varnothing_{lim2}$ for control restriction judgment may both be reduced when the lane width of the travel lane is narrower.

In selected embodiments, corrected first and second yaw angle limits $\varnothing_{lim1}$, $\varnothing_{lim2}$ for control restriction judgment may be used to judge the timing of restriction of the control for preventing deviation from the lane (step S7), and target yaw moment Ms may be computed (step S8).

Operation, Function and Effect

In particular, in the fourth exemplary embodiment, first and second yaw angle limits $\varnothing_{lim1}$, $\varnothing_{lim2}$ for control restriction judgment may be corrected according to vehicle speed V and the width of the travel lane. More specifically, the higher the vehicle speed V or the narrower the lane width, the smaller are both said first and second yaw angle limits $\varnothing_{lim1}$, $\varnothing_{lim2}$ for control restriction judgment. As a result, the timing for restricting control for preventing deviation from the lane may be earlier than that when the lane width of the travel lane becomes narrower in addition to the case when vehicle speed V is higher. In this way, due to the same reasoning as in the first through third exemplary embodiments, it may be possible to restrict timing of control for preventing deviation from the lane such that the driver does not feel uncomfortable with the applied yaw moment.

Also, first and second yaw angle limits $\varnothing_{lim1}$, $\varnothing_{lim2}$ for control restriction judgment are used as the thresholds for restricting control for preventing deviation from the lane, so that in the process of an increase of yaw angle $\varnothing_{front}$, increase in target yaw moment Ms may be suppressed. The yaw moment may then be set at zero. That is, the control for preventing deviation from the lane may be restricted stepwise, or the restriction of control for preventing deviation from the lane may be performed gradually. As a result, it is possible to apply restriction of control for preventing deviation from the lane without making the driver feel uncomfortable with the applied yaw moment.

This embodiment may be realized with the following constitution.

That is, in restriction of control for preventing deviation from the lane in this embodiment, control for preventing deviation from the travel lane may be terminated after the start of the control for preventing deviation from the lane. However, the present disclosure should not be limited to this scheme. For example, a scheme may also be adopted in which the start of control for preventing deviation from the lane is restricted. That is, even when it is judged that there is a high tendency of the vehicle to deviate from the travel lane, control for preventing deviation from the lane may not operate when yaw angle $\varnothing_{front}$ exceeds the yaw angle limit for control restriction judgment.

In the explanation of said embodiment, the processing of steps S5 and S10 of the drive torque control unit may be realized by a control means that perform control to prevent deviation of the vehicle from the travel lane when it is judged that there is a high tendency of the vehicle to deviate from the lane. The processing of step S3 of the drive torque control unit may be realized by the yaw angle acquisition means that acquires the yaw angle formed in the outer direction of the travel lane. The processing in step S7 of the drive torque control unit may be realized by a control restricting means that restricts control for preventing deviation from the lane when the yaw angle acquired by said yaw angle acquisition means exceeds a prescribed threshold. Processing of step S6 of the drive torque control unit may be realized by a correcting means that corrects said prescribed threshold according to the vehicle speed and/or the width of the travel lane.

Advantageously, the present disclosure provides a type of lane deviation prevention device characterized by the following. First, when it is judged that there is a high tendency of the vehicle to deviate from the travel lane, lane deviation prevention control may be started. Next, when a yaw angle formed in the outer direction with respect to the travel lane and acquired by a yaw angle acquisition device exceeds a prescribed threshold (i.e., a first angular limit), the lane deviation prevention control may be restricted. In this case, the prescribed threshold may be corrected according to the speed of the vehicle and/or the width of the lane of travel.

Further, when the yaw angle exceeds a prescribed threshold, the lane deviation prevention control may be restricted to prevent the amount of control (i.e., yaw moment) applied from becoming excessive and uncomfortable to the driver. Additionally, by relating performance of the correction with the vehicle speed and/or width of the lane of travel, the lane deviation prevention control may be restricted so that the driver is not startled by the applied yaw moment.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

What is claimed is:

1. An apparatus to prevent a vehicle from deviating from a lane of travel, the apparatus comprising:
   an acquisition device configured to measure a yaw angle between the vehicle and the lane of travel;
   a lane deviation controller configured to output a yaw moment to maintain the vehicle in the lane of travel;
   a restriction device configured to restrict the yaw moment output when the measured yaw angle exceeds a first angle limit;
   a correction device configured to adjust the first angle limit in response to a measured condition; and
   a second angle limit greater than the first angle limit.

2. The apparatus of claim 1, wherein the measured condition comprises at least one of a speed of the vehicle and a width of the lane of travel.

3. The apparatus of claim 2, wherein the correction device is configured to reduce the first angle limit as the speed of the vehicle increases.

4. The apparatus of claim 2, wherein the correction device is configured to reduce the first angle limit as the width of the lane of travel narrows.

5. The apparatus of claim 1, wherein an unrestricted yaw moment output is proportional to the measured yaw angle.

6. The apparatus of claim 1, wherein the restricted yaw moment output is non-proportional to the measured yaw angle.

7. The apparatus of claim 6, wherein the restricted yaw moment output is a constant.

8. The apparatus of claim 1, wherein the yaw moment output is further restricted when the measured yaw angle exceeds the second angle limit.

9. The apparatus of claim 8, wherein the further restricted yaw moment output is zero.

10. The apparatus of claim 8, wherein the reduction of the restricted yaw moment output to the further restricted yaw moment output as the measured yaw angle exceeds the second limit angle is gradual.

11. An apparatus to prevent a vehicle from deviating from a lane of travel, the apparatus comprising:
   a means for measuring a yaw angle between the vehicle and the lane of travel;
   a controller;
   a means for restricting an output of the controller means when the measured yaw angle exceeds a first angle limit; and
   a means for adjusting the first angle limit in response to a measured condition,
   wherein the restricting means further restricts the output of the controller means when the measured yaw angle exceeds a second angle limit.

12. The apparatus of claim 11, further comprising a dampening means for gradually transforming the restricted output of the controller means to the further restricted output of the controller means as the measured yaw angle exceeds the second angle limit.

13. The apparatus of claim 11, wherein the measured condition comprises at least one of a speed of the vehicle and a width of the lane of travel.

* * * * *